(12) United States Patent
Danielssen et al.

(10) Patent No.: US 6,809,144 B1
(45) Date of Patent: Oct. 26, 2004

(54) RESIN COMPOSITIONS, METHOD OF PRODUCING RESIN COMPOSITIONS AND FILLER BLENDS FOR USE IN RESIN COMPOSITIONS

(75) Inventors: Tore Danielssen, Kristiansand (NO); Anne Linnebo, Asker (NO); Bjorn Sandelin, Kajaani (FI)

(73) Assignees: Elkem ASA (NO); Mondo Minerals Oy (FI)

( * ) Notice: Subject to any disclaimer, the term of this patent is extended or adjusted under 35 U.S.C. 154(b) by 0 days.

(21) Appl. No.: 09/830,860
(22) PCT Filed: Nov. 8, 1999
(86) PCT No.: PCT/NO99/00336

§ 371 (c)(1),
(2), (4) Date: Jun. 11, 2001

(87) PCT Pub. No.: WO00/27911

PCT Pub. Date: May 18, 2000

(30) Foreign Application Priority Data

Nov. 9, 1998 (NO) ................................................ 985211

(51) Int. Cl.⁷ ................................................. C08L 3/36
(52) U.S. Cl. ........................ 524/493; 524/492; 524/451; 524/570; 524/567
(58) Field of Search ................................ 524/451, 492, 524/570, 567, 493; 423/325, 326

(56) References Cited

U.S. PATENT DOCUMENTS

| 4,140,669 | A |   | 2/1979  | Phipps et al. ............. 260/40 R |
|-----------|---|---|---------|-------------------------------------|
| 4,714,733 | A |   | 12/1987 | Itoh et al. .................... 524/423 |
| 4,722,952 | A |   | 2/1988  | Hatt ........................... 523/216 |
| 4,956,404 | A |   | 9/1990  | Pelzig ......................... 524/48 |
| 5,266,609 | A |   | 11/1993 | Hall et al. .................. 523/116 |
| 5,844,037 | A | * | 12/1998 | Lundgard et al. .......... 524/496 |
| 6,143,808 | A | * | 11/2000 | Sack et al. .................. 523/205 |

FOREIGN PATENT DOCUMENTS

| GB | 2210882 A | * | 6/1989 | .......... C08L/63/00 |
|----|-----------|---|--------|----------------------|
| GB | 22108826  |   | 6/1989 |                      |
| JP | 8337059   |   | 12/1996|                      |

* cited by examiner

*Primary Examiner*—David W. Wu
*Assistant Examiner*—Rip A. Lee
(74) *Attorney, Agent, or Firm*—Muserlian, Lucas and Mercanti

(57) ABSTRACT

The present invention relates to thermoplastic resin compositions, particularly polyolefines, polyvinylchloride and polyamide. The thermoplastic resin compositions contain between 3 and 400% by weight of filler based on the weight of the resin, said filler comprising talc and microsilica where the weight ratio between talc and microsilica is between 15:1 and 1:15. The invention further relates to a method for the production of thermoplastic resin compositions, and to a filler blend for use in thermoplastic resins, said blend containing talc and microsilica in a weight ratio between 15:1 and 1:15.

20 Claims, 2 Drawing Sheets

Figure 1:
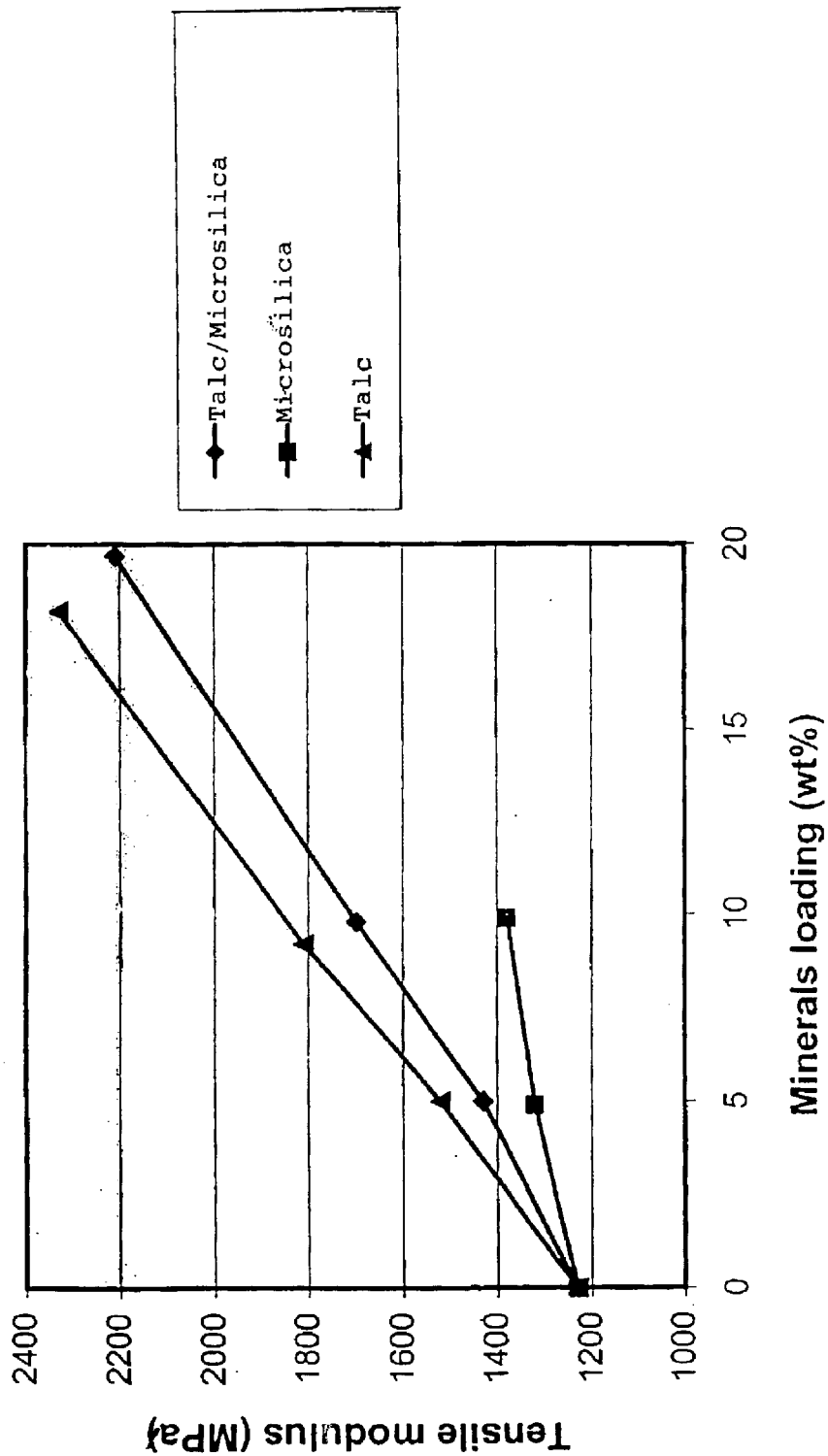

RESIN COMPOSITIONS, METHOD OF PRODUCING RESIN COMPOSITIONS AND FILLER BLENDS FOR USE IN RESIN COMPOSITIONS

TECHNICAL FIELD

The present invention relates to new and improved resin compositions and more particularly to thermoplastic resin compositions such as polyolefines, polyvinylchloride and polyamide, and to a method for the production of resin compositions. The invention further relates to a filler blend for use in the production of resin compositions.

BACKGROUND ART

It is well known to produce polyolefines such as polypropylene compound containing functional fillers such as fine particulate talc to increase the stiffness of the final polypropylene product.

Talc is hydrated magnesium silicate with the theoretical formula $3MgO.4SiO_4.H_2O$ and consists of magnesiumhydroxide sandwiched between two sheets of silica.

When adding other fillers in addition to talc in order to improve other properties, such as for example impact strength, it has, however, been found that the stiffness obtained by using talc alone as a filler is substantially reduced when adding a second filler for increasing the impact strength. It has therefore not been possible to produce polypropylene products with both a high stiffness and a high impact strength. High stiffness and high impact strength is particularly important in some polypropylene products such as for example car bumpers. The same is true for other thermoplastic resin products.

The term thermoplastic resin used in the specification and claims includes not only thermoplastic resins per se, but also mixtures thereof, as well as a blend of thermoplastic resins with other materials such as an elastomer like nitrile rubber. The so-called thermoplastic rubbers, thermoplastic elastomers are also included in the definition of thermoplastic resin. Thermoplastic resins per se includes polyolefines, polystyrene, polyesters, ABS copylymers, polyvinyl chloride (PVC), unplasticized polyvinyl chloride (UPVC), polyamide, acrylic polymers, polycarbonate polymers, polysulfone polymers and others.

It is known from U.S. Pat. No. 4,722,952 that the addition of microsilica to polyvinylchloride, improves the impact strength of polyvinylchloride used for the production of electrical conduits. For such products the stiffness is of no importance. On the contrary, high stiffness is not desired for electrical conduits.

The term microsilica used in the specification and claims is particulate amorphous $SiO_2$ obtained from a process in which silica is reduced and the reduction product is oxidized in vapor phase to form amorphous silica. Microsilica may contain at least 70% by weight silica ($SiO_2$) and have a specific density of 2,1–2.3 $g/cm^3$ and a surface area at 15–30 $m^2/g$. The primary particles are substantially spherical. The primary particles have an average size of about 0,15 $\mu$m. Microsilica is preferably obtained as a co-product in the production of silicon or silicon alloys in electric reduction furnaces. In these processes large quantities of silica are formed as $SiO_2$. The $SiO_2$ is recovered in conventional manner using filter or other collection apparatus. For the purpose of the present invention the term microsilica also shall be understood to include fly-ash, and more particularly fly-ash particles of substantial spherical shape having a particle size below 10 microns.

DISCLOSURE OF INVENTION

It is an object of the present invention to provide thermoplastic resins having both high stiffness and high impact strength.

According to a first aspect, the present invention thus relates to thermoplastic resin compositions, particularly polyolefines, polyvinylchloride and polyamide, characterized in that the thermoplastic resin compositions contains between 3 and 400% by weight of filler based on the weight of the resin, said filler comprising talc and microsilica where the weight ratio between talc and microsilica is between 15:1 and 1:15.

According to a preferred embodiment the weight ratio of talc and microsilica is between 6:1 and 1:5.

According to a second aspect the present invention relates to a method for the production of thermoplastic resin composition, particularly polyolefines, polyvinylchloride and polyamide, which method being characterized in that talc and microsilica is added to thermoplastic resin in a total amount between 3 and 400% by weight based on the weight of thermoplastic resin and where the weight ratio between talc and microsilica is kept between 15:1 and 1:15, whereafter the mixture is formed into a thermoplastic resin product or compound.

According to a preferred embodiment of the method of the present invention talc and microsilica are added to the thermoplastic resin as a mixture of talc and microsilica.

The compounding of the thermoplastic resin can be done using conventional processes like extrusion, calendering, injection molding and others.

According to a third aspect, the present invention relates to a filler blend for use in thermoplastic resins, particularly polyolefines, polyvinylchloride and polyamide, wherein the filler blend contains talc and microsilica in a weight ratio between 15:1 and 1:15, and particularly between 6:1 and 1:5.

It has surprisingly been found that the combined use of talc and microsilica as fillers in thermoplastic resins, particularly in polyolefines, polyvinylchloride and polyamide, give final products having both high stiffness and high impact strength.

EXAMPLE 1

A non-filled polypropylene copolymer "BA 202E" supplied by Borealis was extruded in a compounding extruder with addition of a filler blend consisting of talc supplied by Mondo Minerals OY and microsilica supplied by Elkem ASA. The weight ratio between talc and microsilica in the filler blend was 2:1 and tests were run with addition of 5, 10 and 19% by weight of the filler blend based on the weight of the polypropylene copolymer. The stiffness of the extruded polypropylene was measured as tensile modulus according to ISO 527 and the impact strength of the extruded polypropylene was measured as notched charpy impact strength according to ISO 179/1A.

For comparison purposes the polypropylene copolymer was extruded in the compounding extruder with no addition of filler and with the addition 5, 10 and 18% by weight of talc and with 5 and 10% by weight of microsilica. Also for these comparative tests the stiffness and the impact strength were measured as stated above. The resulting stiffness and impact strength are shown in FIG. 1 and FIG. 2 respectively.

Figure 2:
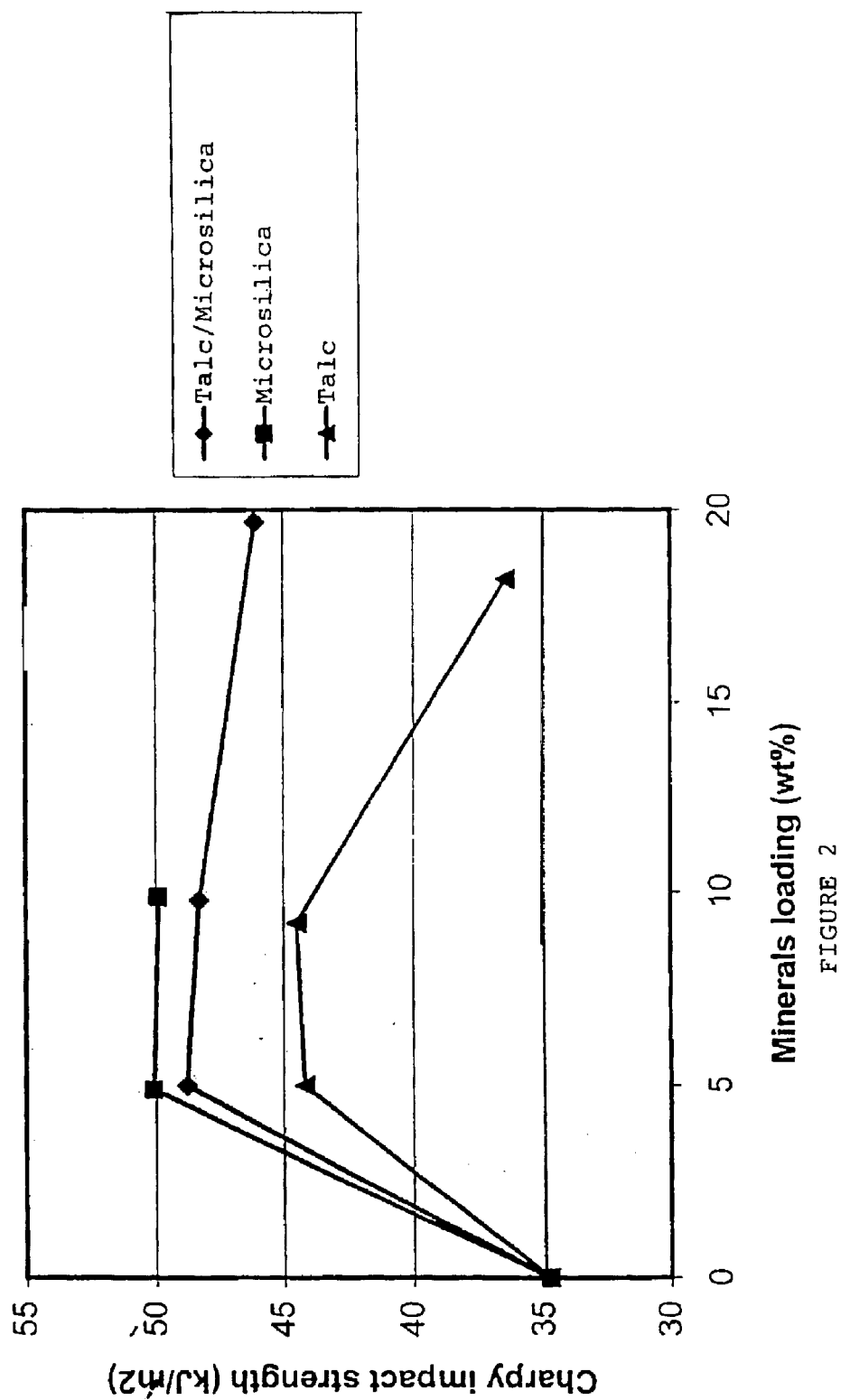

As can be seen from FIG. 1 and 2, the impact strength of the polypropylene containing both talc and microsilica is much higher than for the polypropylene containing only talc and only slightly lower than for the polypropylene containing only microsilica as a filler. The stiffness of the polypropylene containing both talc and microsilica is much higher than for polypropylene containing only microsilica as a filler and only slightly lower than for polypropylene containing only talc as a filler. The use of a blend of talc and microsilica thus surprisingly gives a polypropylene having both a high stiffness and a high impact strength.

EXAMPLE 2

A non-filled high density polyethylene (HDPE) copolymer "HDPE HE 2467-BL" supplied by Borealis was extruded in a compounding extruder with addition of a filler blend consisting of talc supplied by Mondo Minerals OY and microsilica supplied by Elkem ASA. The weight ratio between talc and microsilica in the filler blend was 2:1 and the test was run with addition of 10% by weight of the filler blend based on the weight of the HDPE copolymer. The stiffness of the extruded HDPE was measured as tensile modulus according to ISO 527 and the impact strength of the extruded HDPE was measured as notched charpy impact strength according to ISO 179/1A.

For comparison purposes the HDPE copolymer was extruded in the compounding extruder with no addition of filler, with the addition 10% by weight of talc and with addition of 10% by weight of microsilica. Also for these comparative tests the stiffness and the impact strength were measured as stated above. The resulting stiffness and impact strength are shown in table 1.

TABLE 1

| Material | Tensile Modulus (MPa) | Impact Strength (kJ/m$^2$) |
| --- | --- | --- |
| HDPE nonfilled | 850 | 13.6 |
| HDPE + 10% talc | 1160 | 18.0 |
| HDPE + 10% microsilica | 880 | 27.6 |
| HDPE + 10% filler blend | 1070 | 22.3 |

As can be seen from table 1, the impact strength of the HDPE containing both talc and microsilica is higher than for the HDPE containing only talc, but lower than for the HDPE containing only microsilica as a filler. The stiffness of the HDPE containing both talc and microsilica is much higher than for HDPE containing only microsilica as a filler and only slightly lower than for HDPE containing only talc as a filler. The use of a blend of talc and microsilica thus surprisingly resulting in a HDPE having both a high stiffness and a high impact strength.

EXAMPLE 3

A non-filled polyvinylchloride (PVC) polymer was calendered with addition of a in filler blend consisting of talc supplied by Mondo Minerals OY and microsilica supplied by Elkem ASA. The weight ratio between talc and microsilica in the is filler blend was 2:1 in one run and 1:2 in another run, and the tests were run with addition of 5% by weight of the filler blend based on the weight of PVC polymer. The stiffness of the calendered PVC was measured as tensile modulus according to ISO 527 and the impact strength of the calendered PVC was measured as notched charpy impact strength according to ISO 179/1A.

For comparison purposes the PVC polymer was calendered with no addition of filler, with addition of 5% by weight of talc and with addition of 5% by weight of microsilica. Also for these comparative tests the stiffness and the impact strength were measured as stated above. The resulting stiffness and impact strength are shown in table 2.

TABLE 2

| Material | Tensile Modulus (MPa) | Impact Strength (kJ/m$^2$) |
| --- | --- | --- |
| PVC nonfilled | 2916 | 6.5 |
| PVC + 5% talc | 3484 | 5.4 |
| PVC + 5% microsilica | 3010 | 8.5 |
| PVC + 5% filler blend talc/microsilica 2:1 | 3360 | 5.1 |
| PVC + 5% filler blend talc/microsilica 1:2 | 3167 | 7.9 |

As can be seen from table 2, the impact strength of PVC containing talc and microsilica in a ratio of 2:1 is about the same as for the PVC containing only talc, but lower than for PVC containing only microsilica as a filler. For PVC containing talc and microsilica in a ratio of 1:2 it can be seen that the impact strength is higher than for PVC containing talc and microsilica in a ratio of 2:1 and almost as high as for PVC containing only microsilica. The stiffness of the PVC containing talc and microsilica in a ratio of 2:1 is much higher than for PVC containing only microsilica as a filler and only slightly lower than for PVC containing only talc as a filler. For PVC containing talc and microsilica in a ratio of 1:2 it will be seen that the tensile modulus is still higher than for PVC containing only microsilica. The use of a blend of talc and microsilica thus surprisingly gives a PVC having both a high stiffness and a high impact strength.

EXAMPLE 4

A non filled polyamide (PA) polymer, "PA6 Ultramid B35" delivered by BASF was extruded in a compounding extruder with addition of a filler blend consisting of talc supplied by Mondo Minerals OY and microsilica supplied by Elkem ASA. The addition of filler blend was 10% by weight of polymer. The weight ratio between talc and microsilica in the filler blend in a first test was 1:1 and 1:2 in a the second test. The stiffness of the extruded PA was measured as tensile modulus according to ISO 527 and the impact strength of the extruded PA was measured as notched charpy impact strength according to ISA 179/1A.

For comparison purposes the PA copolymer was extruded in the compounding extruder with no addition of filler, with the addition 10% by weight of talc and with addition of 10% by weight of microsilica. Also for these comparative tests the stiffness and the impact strength were measured as stated above. The resulting stiffness and impact strength are shown in table 3.

TABLE 3

| Material | Tensile Modulus (MPa) | Impact Strength (kJ/m$^2$) |
| --- | --- | --- |
| PA nonfilled | 700 | Non-break |
| PA + 10% talc | 1430 | 10.6 |
| PA + 10% microsilica | 890 | 33.2 |

TABLE 3-continued

| Material | Tensile Modulus (MPa) | Impact Strength (kJ/m$^2$) |
|---|---|---|
| PA + 10% filler blend talc/microsilica 1:1 | 1210 | 16.3 |
| PA + 10% filler blend talc/microsilica 1:2 | 1120 | 19.7 |

As can be seen from table 3, the impact strength of the PA containing both talc and microsilica is much higher than for the PA containing only talc, but lower than for the PA containing only microsilica as a filler. It can also be seen that the impact strength increases with increasing amount of microsilica in the filler blend. The stiffness of the PA containing both talc and microsilica is much higher than for PA containing only microsilica, but the stiffness is slightly reduced when the microsilica content in the filler blend is increased.

What is claimed is:

1. A thermoplastic resin composition comprising a thermoplastic resin, between 3 and 400% by weight of filler based on the weight of the resin, said filler comprising talc and microsilica where the weight ratio between talc and microsilica is between 15:1 and 1:15, said microsilica being an amorphous particulate having a size of about 0.15 μm, containing at least 70% by weight SiO$_2$ and obtained from a gaseous phase from the reduction of silica.

2. The thermoplastic resin composition according to claim 1 wherein the weight ratio of talc and microsilica is between 6:1 and 1:5.

3. The thermoplastic resin composition according to claim 1 wherein the thermoplastic resin is selected from the group consisting of polyolefines, polyvinylchloride and polyamides.

4. The thermoplastic resin composition according to claim 3 wherein the weight ratio of talc and microsilica is between 6:1 and 1:5.

5. A filler blend for use in thermoplastic resin composition consists of talc and microsilica in a weight ratio between 15:1 and 1:15, said microsilica being an amorphous particulate having a size of about 0.15 μm, containing at least 70% by weight SiO$_2$ and obtained from a gaseous phase from the reduction of silica.

6. The filler blend according to claim 5 wherein the filler blend consists of talc and microsilica in a weight ratio between 6:1 and 1:5.

7. A method for production of a thermoplastic resin composition comprising adding talc and microsilica to a thermoplastic resin in a total amount between 3 and 400% by weight based on the weight of thermoplastic resin, where the weight ratio between talc and microsilica is kept between 15:1 and 1:15, said microsilica being an amorphous particulate having a size of about 0.15 μm, containing at least 70% by weight SiO$_2$ and obtained from a gaseous phase from the reduction of silica, whereafter the mixture is formed into a thermoplastic resin composition.

8. The method according to claim 7 wherein the talc and microsilica are added to the thermoplastic resin as a mixture of talc and microsilica.

9. The method according to claim 7 wherein the talc and microsilica are added separately to the thermoplastic resin.

10. The method according to claim 7 wherein the thermoplastic resin is selected from the group consisting of polyolefines, polyvinylchloride and polyamides.

11. The method according to claim 10 wherein the talc and microsilica are added to the thermoplastic resin as a mixture of talc and microsilica.

12. The method according to claim 10 wherein the talc and microsilica are added separately to the thermoplastic resin.

13. The method according to claim 7 wherein the weight ratio of talc and microsilica is between 6:1 and 1:5.

14. A method for production of a thermoplastic resin product comprising:

adding talc and microsilica to a thermoplastic resin in a total amount between 3 and 400% by weight based on the weight of thermoplastic resin and where the weight ratio between talc and microsilica is kept between 15:1 and 1:15 to form a mix, said microsilica being an amorphous particulate having a size of about 0.15 μm, containing at least 70% by weight SiO$_2$ and obtained from a gaseous phase from the reduction of silica; and compounding said mix to form a thermoplastic resin product.

15. The method according to claim 14 wherein the compounding is selected from the group consisting of extruding, calendaring, and injection molding.

16. The method according to claim 14 wherein the thermoplastic resin is selected from the group consisting of polyolefines, polyvinylchloride, and polyamides.

17. The method according to claim 14 wherein the talc and microsilica are added to the thermoplastic resin as a mixture of talc and microsilica.

18. The method according to claim 14 wherein the talc and microsilica are added separately to the thermoplastic resin.

19. The method according to claim 14 wherein the weight ratio of talc and microsilica is between 6:1 and 1:5.

20. The method according to claim 16 wherein:

compound is extruding;

the talc and microsilica are added to the thermoplastic resin as a mixture; and the weight ratio of talc and microsilica is between 6:1 and 1:5.

* * * * *